Aug. 31, 1937.   H. D. COLMAN   2,091,269
CLUTCH MECHANISM
Filed March 5, 1934   7 Sheets-Sheet 2

INVENTOR
Howard D. Colman
BY
Chindahl, Parker & Carlson
ATTORNEYS

Aug. 31, 1937.   H. D. COLMAN   2,091,269
CLUTCH MECHANISM
Filed March 5, 1934   7 Sheets-Sheet 3
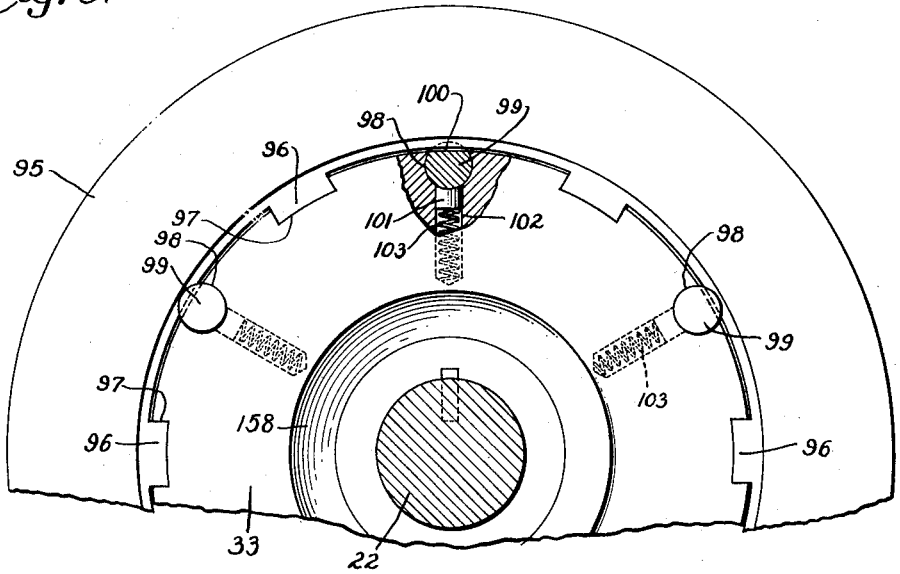
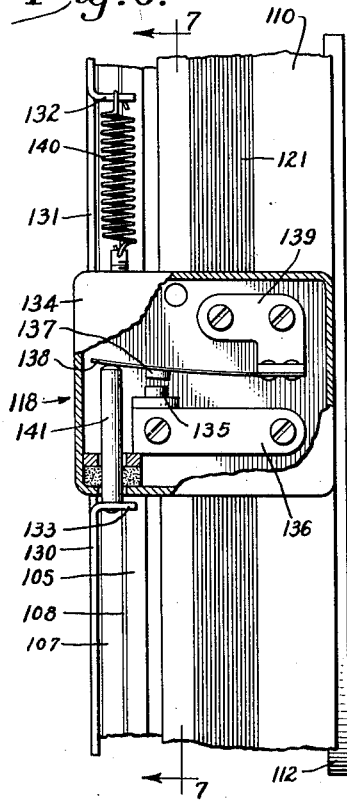
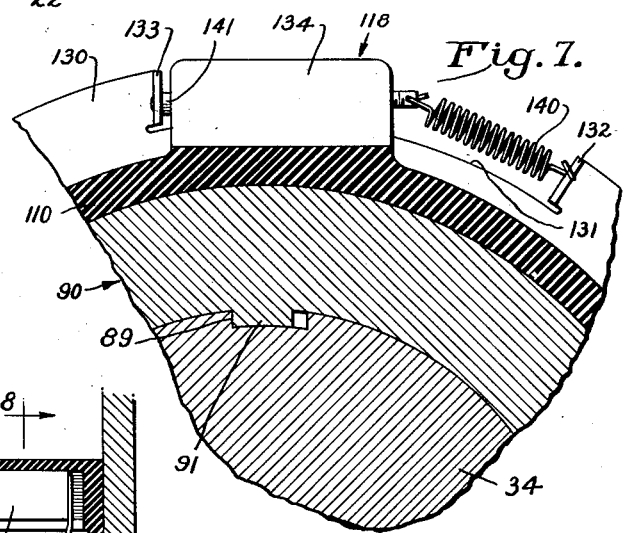
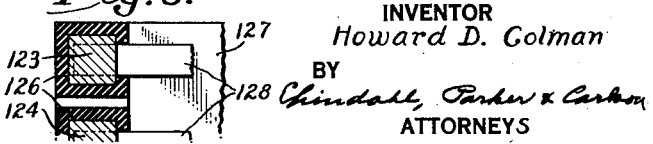
INVENTOR
Howard D. Colman
BY
Chindall, Parker & Carlson
ATTORNEYS Aug. 31, 1937.　　　　H. D. COLMAN　　　　2,091,269
CLUTCH MECHANISM
Filed March 5, 1934　　　　7 Sheets-Sheet 4
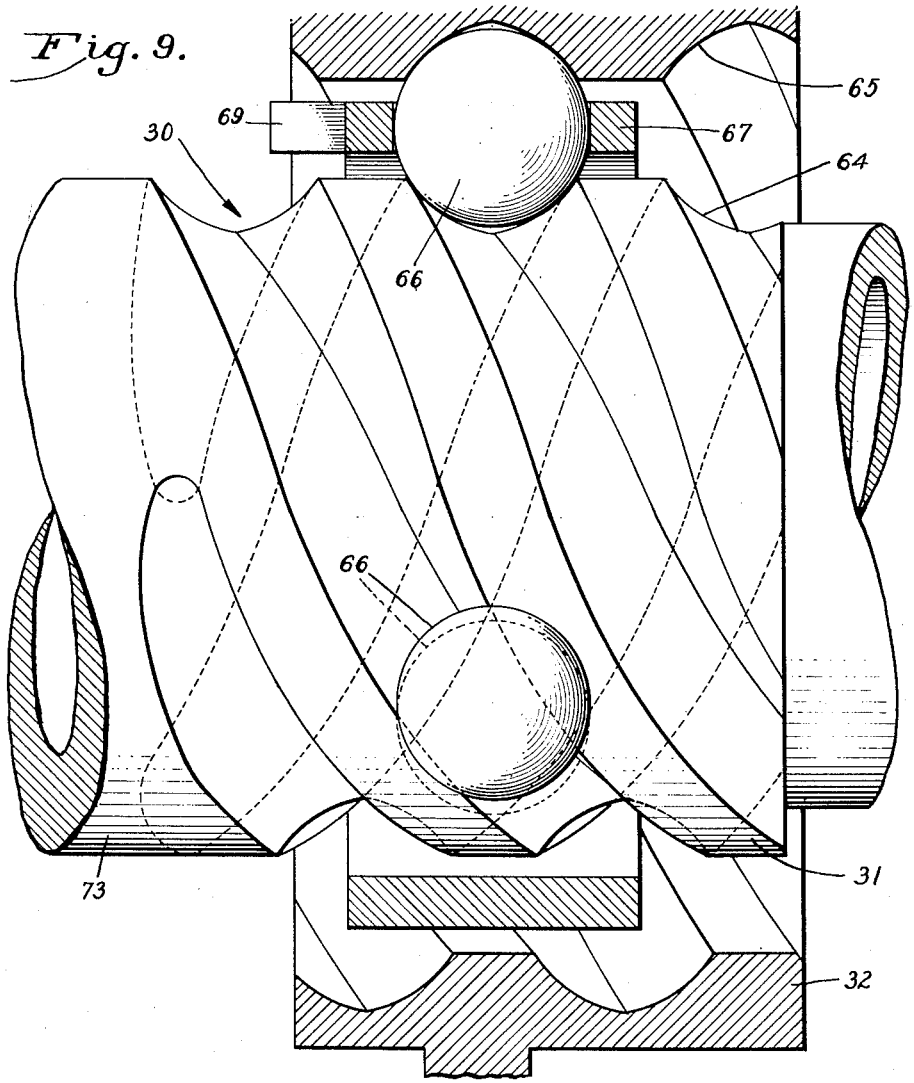
INVENTOR
Howard D. Colman
BY
Chindall, Parker & Carlson
ATTORNEYS Aug. 31, 1937.  H. D. COLMAN  2,091,269
CLUTCH MECHANISM
Filed March 5, 1934  7 Sheets-Sheet 5

INVENTOR
Howard D. Colman
BY
Chindahl, Parker + Carlson
ATTORNEYS

Aug. 31, 1937.  H. D. COLMAN  2,091,269
CLUTCH MECHANISM
Filed March 5, 1934  7 Sheets-Sheet 6
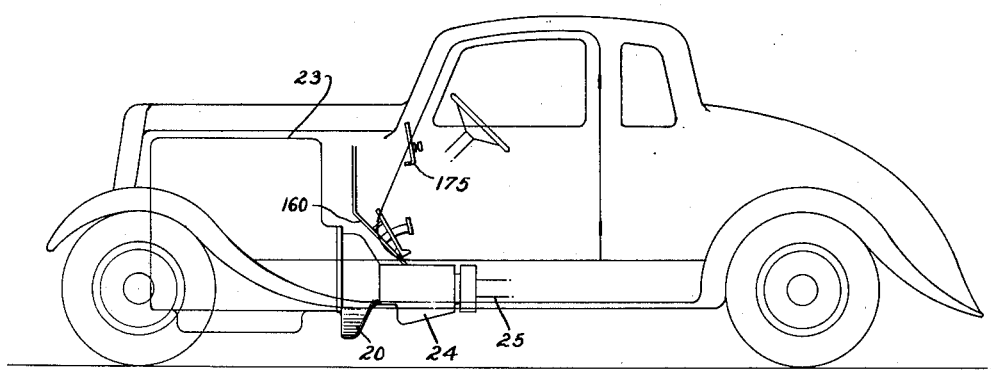
Fig. 13.
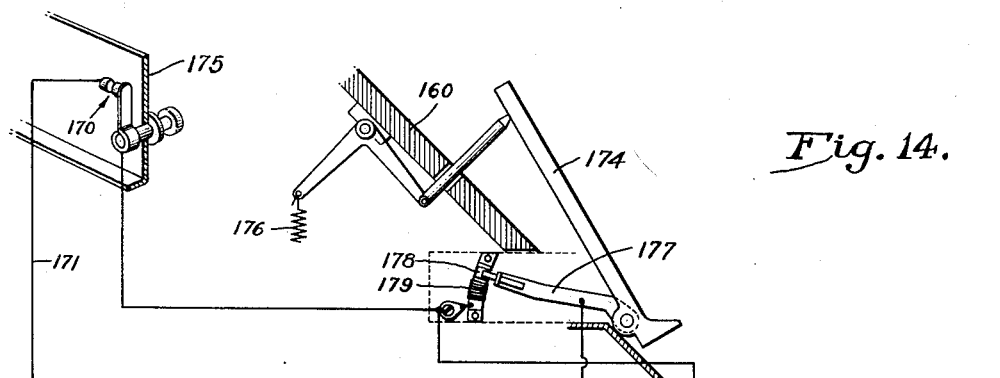
Fig. 14.
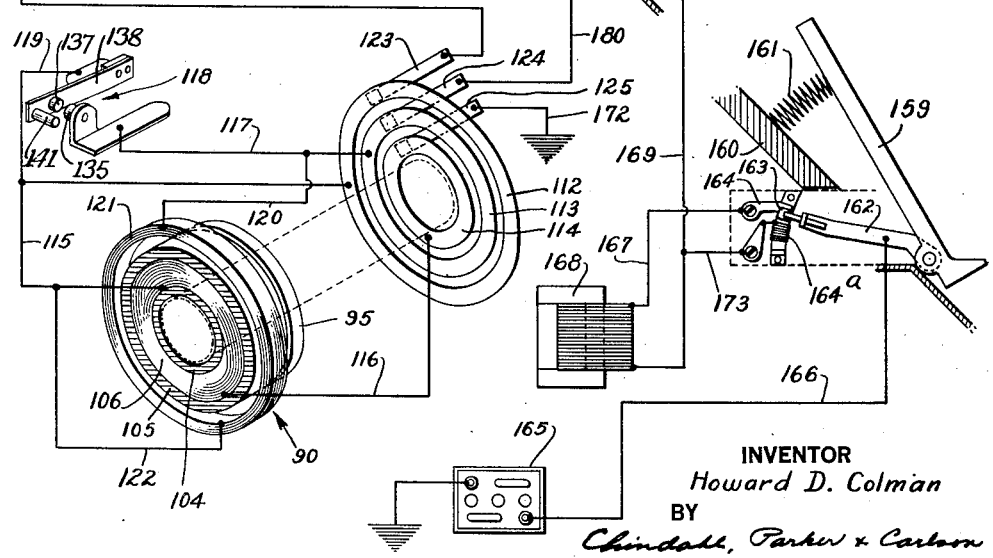
INVENTOR
Howard D. Colman
BY
Chindall, Parker & Carlson
ATTORNEYS

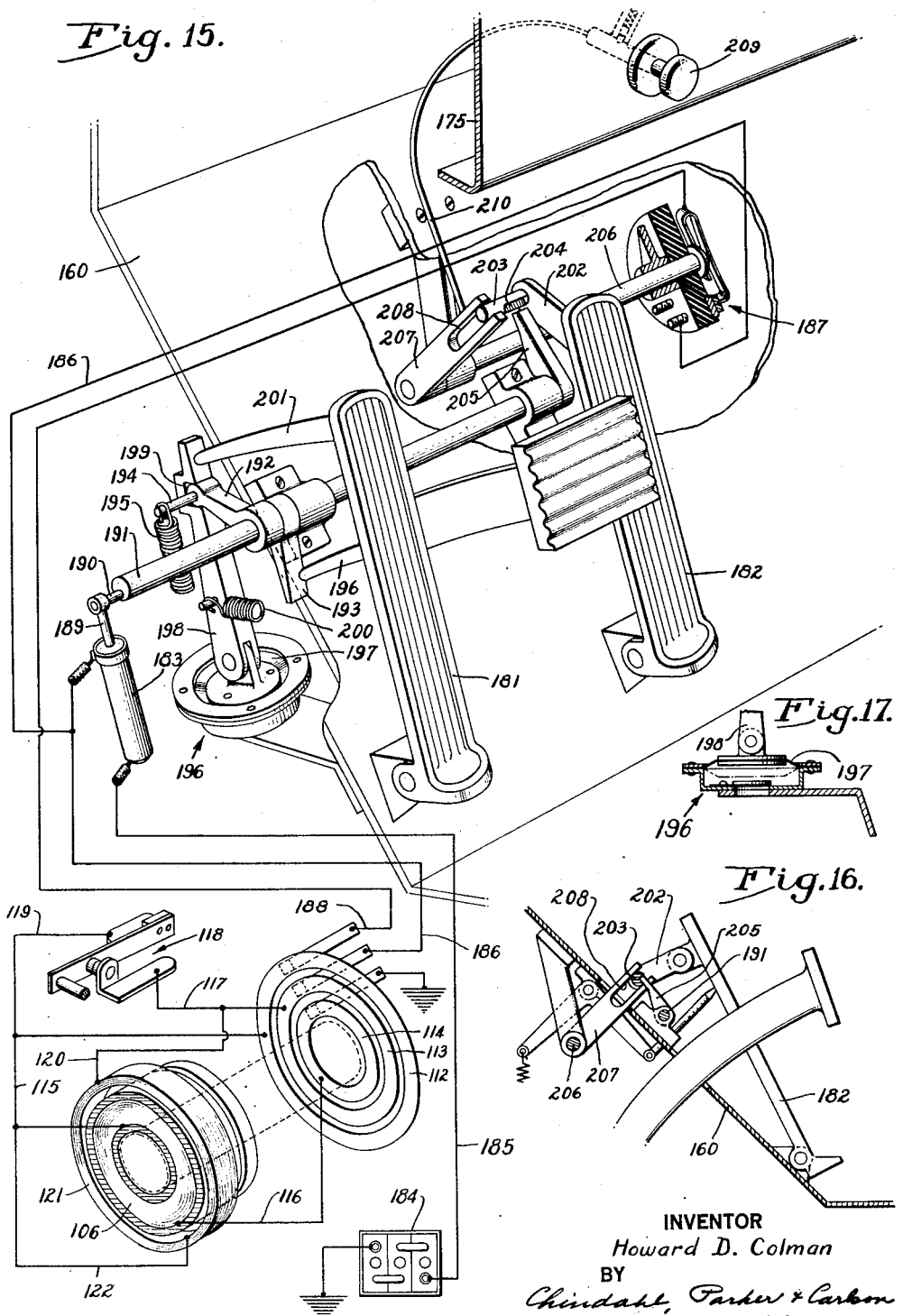

Patented Aug. 31, 1937

2,091,269

UNITED STATES PATENT OFFICE 2,091,269

CLUTCH MECHANISM

Howard D. Colman, Rockford, Ill.

Application March 5, 1934, Serial No. 714,169

34 Claims. (Cl. 192—.01)

The present invention relates to a new and improved clutch mechanism which is adapted particularly for use in motor vehicles, and to provide either a conventional drive or free wheeling at the option of the user.

Free wheeling is commonly obtained by the use of an automatic clutch adapted to be opened by the suction of the motor whenever the throttle pedal is released, or by the use of an over-running clutch in series with an ordinary clutch, and adapted to permit the speed of the vehicle to exceed that of the motor.

Each form is subject to certain disadvantages. Thus, the automatic clutch, although affording free wheeling or coasting with the motor operating at an idling speed when the throttle pedal is up, will close immediately under full pressure whenever the throttle pedal is partially depressed regardless of whether or not the speeds of the driving and driven clutch elements are synchronized. Usually the clutch elements are not synchronized in speed, and hence the closing of the clutch results in a decidedly noticeable shock which detracts from the smooth riding qualities of the vehicle, and which produces excessive wear on the friction plates. If the closing of the automatic clutch were to be delayed, there would still be no assurance of synchronism.

The over-running clutch is not subject to the foregoing disadvantages since, if the throttle pedal is depressed to accelerate the motor, it will engage only when the speed of the driving element reaches and starts to exceed that of the normally driven element. However, the over-running clutch alone does not permit gear shifting, without the use of the clutch pedal, except into intermediate and high speed positions, and is incapable of utilizing the motor as a brake when going down steep hills, or of providing a reverse drive connection. Hence, a third clutch, usually a positive jaw clutch or its equivalent, adapted to drive in either direction, is provided for connecting the power drive around the over-running clutch at the option of the user. This third clutch is manually operable, and if closed when the relative speed of the driving and driven elements is substantial will cause a violent shock.

Neither one of the two clutches ordinarily employed for free wheeling therefore affords all of the advantages of the other. Hence, both types of free wheeling clutches have in some instances been incorporated as separate units in the same vehicle drive, and have been placed under a manual dash control whereby to obtain a conventional drive, or free wheeling by the use of the over-running clutch only or by the use of the automatic clutch and the over-running clutch. This combination involves a duplication of free wheeling units, at increased expense, and still does not avoid the possibility of shock when converting to the conventional drive.

The primary object of the present invention resides in the provision of a novel clutch mechanism in a unitary structure having all of the advantages and operating functions of both the usual automatic clutch and over-running clutch, and adapted for use also in the conventional drive.

A further object is to provide a new and improved clutch mechanism of the foregoing character including a time device when set for free wheeling which is automatically operable to delay the engagement of the clutch when the throttle pedal is initially depressed until the motor has had an opportunity to accelerate, and which may be rendered ineffective by depressing the clutch pedal to eliminate the delay when desired, or varied in effectiveness by the position of the throttle pedal to vary the delay in accordance with the motor speed, thereby placing the time and rate of clutch engagement under the full control of the operator.

A further object is to provide a novel unitary clutch mechanism which is selectively available for free wheeling or a conventional drive, and in which the conversion from the former to the latter may be accomplished without any possibility of shock, unless it becomes necessary in an emergency to immediately utilize the braking action of the motor. In the latter event, the shock is never as great as that resulting when closing a positive clutch to cut out the usual over-running clutch unit.

Another object resides in the provision of a novel time device in one form of the invention which does not affect the delay in clutch engagement through the actuation of mechanical parts.

Still another object resides in the provision of a new and improved clutch mechanism of the foregoing character in which the pressure of clutch engagement, when under the control of the throttle pedal as in free wheeling, is automatically varied in accordance with the position of the pedal and therefore with the torque of the motor, and, when under the sole control of the clutch pedal as in the conventional drive, is subject to a finely graduated variation over substantially the entire stroke of the clutch pedal so as to permit accurate control of any desired degree of clutch slippage.

A further object resides in the provision of a novel clutch mechanism adapted for use in the conventional drive of a motor vehicle under the control of a clutch pedal in which very little effort is required to actuate the pedal.

Another object is to provide a new and improved clutch mechanism adapted for various purposes, and more particularly having a main clutch, and a pilot clutch operable in either direction through an anti-friction screw device to close the main clutch.

Other detailed objects reside in the provision of one or more of the following, namely: an electromagnetic pilot clutch in the foregoing combination which is self-adjustable to compensate for wear, and which may be rendered adjustable to vary its power upon reversal in torque; ball bearing splines for centering and guiding each movable element of the main clutch; and novel means for preventing lubricant from entering between the coacting surfaces of the main and pilot clutches.

Further objects and advantages will become apparent as the description proceeds.

In the accompanying drawings, Fig. 1 is a fragmentary axial sectional view of a clutch mechanism with a main clutch and an electromagnetic pilot clutch, embodying the features of my invention.

Fig. 5 is a fragmentary transverse sectional view of the pilot clutch taken substantially along line 5—5 of Fig. 1.

Fig. 6 is a fragmentary plan view of the pilot clutch, partially in section along line 6—6 of Fig. 1 through a switch on the electromagnet.

Fig. 7 is a fragmentary transverse sectional view taken substantially along line 7—7 of Fig. 6.

Fig. 8 is a fragmentary sectional detail view taken along line 8—8 of Fig. 6, and illustrating contact brushes in the electric circuits for the electromagnet.

Fig. 9 is a view on an enlarged scale of a ball screw device forming part of the means for actuating the main clutch.

Fig. 13 is a side view of an automobile provided with a clutch mechanism embodying the features of the present invention.

Fig. 14 is a diagrammatic representation of the electrical control apparatus for the pilot clutch.

Fig. 15 is a diagrammatic representation of a modified mechanical control mechanism for the pilot clutch.

Fig. 16 is a fragmentary detail view of the mechanism shown in Fig. 15.

Fig. 17 is a detail sectional view.

Figure 1:
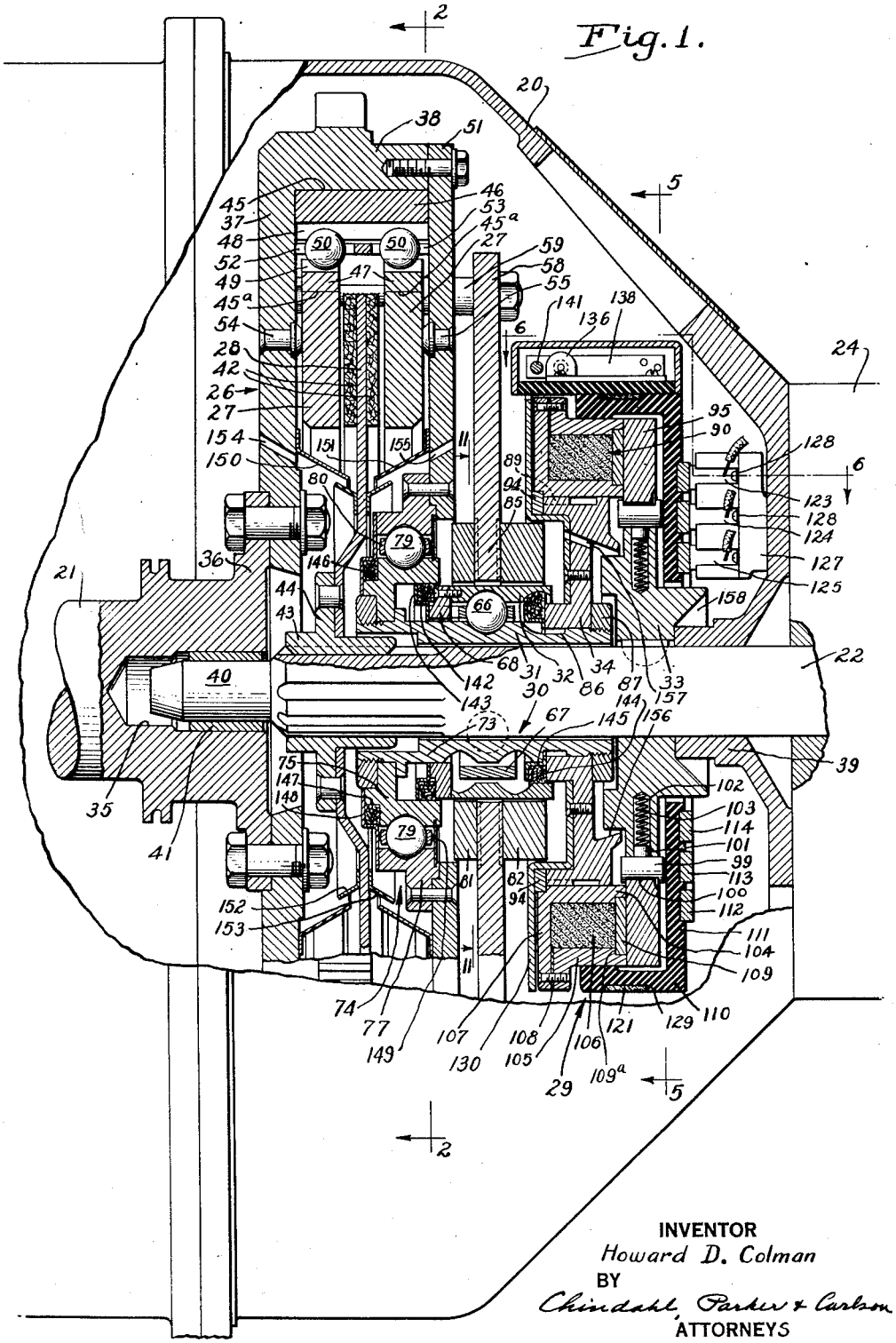

Referring more particularly to the drawings, the clutch mechanism constituting the exemplary embodiment of the invention is mounted within a suitable housing 20, and is interposed between a driving shaft 21 and a driven shaft 22. Within the broad aspects of the invention, the clutch mechanism may be adapted for various purposes. However, it is particularly suited for, and hence is disclosed as incorporated in the power plant of an automobile or other motor vehicle. Thus, the driving shaft 21 is the crank shaft of a motor 23 (see Fig. 13), and the driven shaft 22 is adapted to be connected through a change-speed gear box 24 to a transmission shaft 25 extending to the rear of the vehicle. As shown, the clutch housing 20 is secured in position between the crank case of the motor 23 and the gear box 24.

The clutch mechanism generally comprises a main clutch 26 having driving and driven elements 27, 27 and 28 which are adapted to be moved into and out of coacting engagement, and which are secured respectively to the shafts 21 and 22 for rotation therewith. The main clutch 26 is normally open, i. e. the coacting elements thereof are yieldably urged apart, and is adapted to be closed by a pilot clutch 29 acting through an anti-friction screw device 30. This device comprises a rotatable screw 31 and a nut 32 threaded thereon for axial movement. The nut 32 is operatively connected to the movable clutch element 27, 27, and is adapted upon movement in opposite directions out of a neutral or intermediate position to move one or the other of the clutch elements into gripping engagement with the element 28. The screw 31 and nut 32 are urged into relative neutral position by the opening action of the clutch 26, and rotate as a unit with the driving element 27, 27. The pilot clutch 29 comprises coacting clutch elements 33 and 34 secured respectively to the driven shaft 22 and the screw 31. When the pilot clutch 29 is closed, a rotational drag resulting from the positive or negative rotation of the shaft 22 relative to the shaft 21 is applied to the screw 31, thereby causing relative rotation between the screw and the nut 32 to close the main clutch. When the clutch mechanism is converted to effect free wheeling, the drag in one direction which would result if the shaft 22 were to overrun the shaft 21, is reduced to such an extent that it is incapable of overcoming the opening action of the main clutch 26.

The engine crank shaft 21 (see Fig. 1) extends into one side of the housing 20, and the inner end thereof is formed with an axial bore 35 and with an annular peripheral flange 36. A flywheel 37 in the form of an annular disk having a rim 38 on one side is securely bolted to the flange 36. The driven shaft 22 extends through a bearing sleeve 39 in the other side of the housing 20, and has a reduced inner end 40 supported in a bushing 41 within the bore 35. Thus, the shafts 21 and 22 are mounted in coaxial relation, with the shaft 22 extending substantially through the housing 20 and telescopically supported by the shaft 21.

The main clutch 26 may be provided in various forms, but preferably is of the friction disk type in which the driven element 28 consists of a single plate splined for axial movement on the shaft 22, and provided on opposite sides with friction rings 42, and in which the driving element 27, 27 consists of two parallel annular plates mounted on the flywheel 37 respectively at opposite sides of the plate 28 for axial movement into coacting engagement with the friction rings 42. A sleeve 43 axially splined on the driving shaft 22 extends through the center of the intermediate clutch plate 28 and has a flange 44 to which the inner periphery of the plate is rigidly secured.

Figure 2:
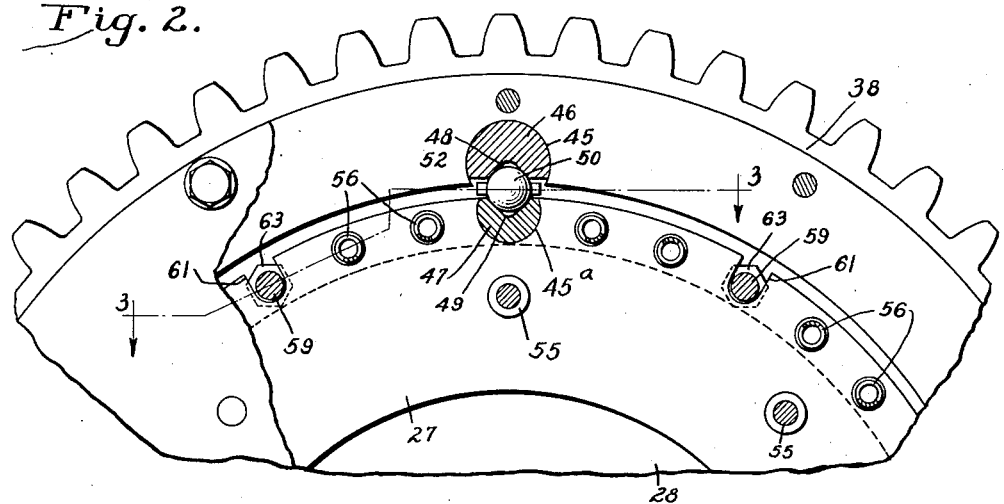
Fig. 2 is a fragmentary cross-sectional view of the main clutch taken substantially along line 2—2 of Fig. 1.

The movable clutch plates 27 have an antifriction axial spline connection with the flywheel 37 (see Figs. 1 and 2). Thus, a plurality of uniformly peripherally spaced opposed recesses or bores 45 and 45ᵃ are formed respectively to intersect the inner surface of the rim 38 and the outer surfaces of the clutch plates 27. Hardened steel inserts 46 and 47 are securely fitted in the recesses 45 and 45ᵃ, and are formed respectively with coacting V-shaped raceways 48 and 49 parallel to the axis. In the present instance, two sets of raceways 48 and 49 located in diametrically opposed relation are provided. Disposed respectively between the inner raceways 49 and the coacting outer raceways 48, and in bearing engagement therewith, are a plurality of balls 50. The flywheel 37 and a flat annular plate 51 secured to the free end of the rim 38 serve to prevent outward displacement of the balls 50. Disposed between the clutch plates 27 and the rim 38 and held endwise between the flywheel 37 and the end plate 51 are two spacer plates 52. Each of the plates 52 is formed in opposite ends with longitudinal slots 53 freely receiving the associated set of balls 50, and serving to prevent accidental inward displacement thereof. The ball bearing splines just described serve to center the clutch plates 27 relative to the flywheel 37. They also prevent relative angular motion between the clutch plates 27 and the flywheel 37, but permit free independent axial movement of each plate without any appreciable friction.

Normally the movable clutch plates 27 are yieldably pressed apart, and out of engagement with the intermediate clutch plate 28, against two sets of peripherally spaced stops 54 and 55 mounted respectively in the flywheel 37 and the plate 51. These stops, although not essential, are desirable because they prevent direct contact over a large surface area between the clutch plates 27 and the flywheel 37 and plate 51. If they were not provided, fine powder resulting from wear on the friction rings 42 might work in between these parts, and tend to prevent complete opening of the clutch 26. The stops 54 and 55 project inwardly a slight distance from their respective supports, and are small in bearing area, so that there is practically no chance of powder or dust to lodge thereon and prevent the opening of the clutch to any material extent.

Figure 3:
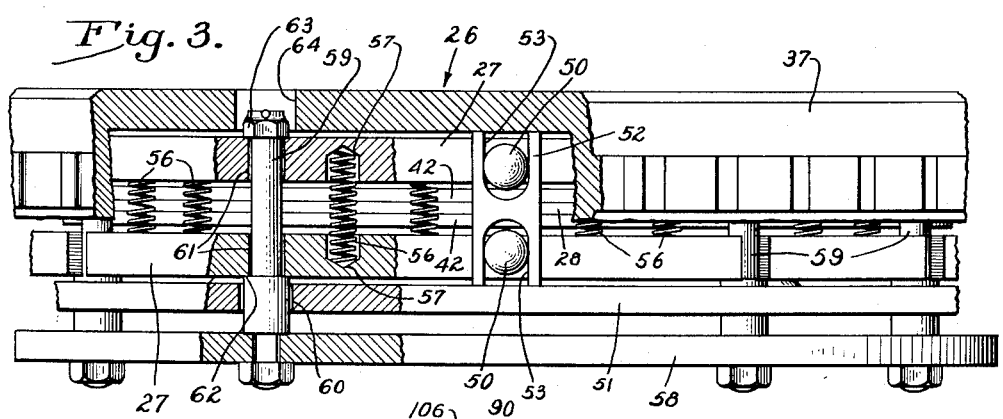
Fig. 3 is a fragmentary plan view of the main clutch, partially in section substantially along broken line 3—3 of Fig. 2.

Preferably, the yieldable means (see Figs. 2 and 3) for opening the clutch 26 comprises a plurality of uniformly peripherally spaced coil compression springs 56 disposed between the movable plates 27. The outer peripheral margins of the plates 27 project beyond the outer periphery of the intermediate plate 28, and are formed in their adjacent sides with a plurality of opposed recesses or spring seats 57 in which opposite ends of the springs 56 are seated.

A single actuator is provided for moving the clutch plates 27 against the action of the springs 56 into engagement with the intermediate plate 28 to close the clutch 26. In the present instance, this actuator comprises a flat annular plate 58 disposed about and movable in either direction axially of the driven shaft 22. Anchored in uniformly spaced relation to the actuator plate 58 adjacent its outer periphery, and extending in the direction of adjustment thereof, are a plurality of parallel studs 59 which project through openings 60 in the plate 51. The free end of each stud 59 has a portion of reduced diameter which projects through aligned openings 61 in the movable clutch plates 27 between the springs 56, and which at one end defines an annular shoulder 62 for engaging the outer face of one of the clutch plates, and at the other end has a nut 63 threaded thereon for engaging the outer face of the other clutch plate. The nuts 63 are freely disposed in openings 64 in the flywheel 37. It will be evident that upon adjustment of the actuator plate 58 to the right as viewed in Fig. 1, the nuts 63 will compress and hold the clutch plates 27 and 28 in frictional engagement and as a unit against the adjacent stops 55 to close the clutch 26. Conversely, upon adjustment of the actuator plate 58 in the opposite direction, the shoulders 62 will press the clutch plates 27 and 28 against the adjacent stops 54. Thus, adjustment of the actuator plate 58 out of neutral in either direction will establish a driving connection between the shafts 21 and 22. Since the studs 59 extend through the plates 27 and 28, the actuator plate 58 is constrained to rotate with the flywheel 37.

The actuator plate 58 is adapted to be operated by the pilot clutch 29 through the anti-friction screw device 30 (see Figs. 9 to 12). The screw 31 and nut 32 of the device 30 are formed respectively with complementary screw threads 64 and 65. Preferably, the device 30 has a triple thread with a lead approximately equal to the outside diameter of the screw 31, although any suitable number of threads and threads of any satisfactory lead may be provided. Interposed between the inner and outer threads 64 and 65 are a plurality of balls 66. In the present instance, one ball 66 is provided for each thread 64 of the screw 31, and the three balls are held in uniformly spaced relation in a common transverse plane by an annular cage 67. Preferably, the screw threads 64 and 65 are non-circular in axial section so that each ball 66 has a four point contact with the screw 31 and nut 32.

To prevent the cage 67 from creeping and the balls 66 from working out of the ends of the threads 64 and 65, the cage is permitted only a limited degree of rotation relative to the nut 32. The means (see Fig. 12) for this purpose comprises an annular ring 68 secured to one end of the nut 32 and closely encircling the screw 31. A lug 69 on one end of the cage 67 projects into an arcuate notch 70 formed in the inner periphery of the ring 68. The opposite end faces of the notch 70 constitute spaced stops 71 and 72 adapted to coact with the lug 69 to limit the degree of rotation of the cage 67 in both directions.

The screw 31 is formed integral with an elongated sleeve 73 which is freely disposed about the driven shaft 22, and which is supported in a fixed axially suspended position on the flywheel 37 by an end-thrust bearing 74 (see Fig. 1). The latter comprises an inner sleeve 75 rigidly secured on one end of the sleeve 73, and formed in its outer periphery with an annular groove or raceway 76, and an outer concentric sleeve 77 rigidly secured to the plate 51, and formed in its inner periphery with a complementary groove or raceway 78. A plurality of balls 79 are interposed between the raceways 76 and 78 and in bearing engagement therewith. The balls 79 are held in uniformly spaced relation by a cage 80 loosely disposed between the sleeves 75 and 77. Preferably, the raceways 76 and 78 are non-circular in lateral section, so as to provide a four point contact with each ball 79. The bearing 74 thus is of the type adapted to support a radial load, and also an axial thrust in either direction.

The nut 32 also is in the form of a sleeve, and is connected to the actuator plate 58 for rotation and axial movement therewith. Preferably, the connection (see Figs. 1, 10, and 11) is self-adjusting to compensate for any misalignment of the plate 58 and to equalize the pressure on the balls 66. Thus, the connection comprises two equalizer rings 81 and 82 secured together in axially spaced relation, by means of a plurality of spacer bolts 83, and disposed against opposite sides of two outwardly projecting and diametrically opposed lugs 84 on the outer periphery of the nut 32. The bolts 83 are uniformly spaced about the periphery of the nut 32, and are provided in a number which is some multiple of four, as for example eight. The lugs 84 extend between adjacent bolts 83, and are of a width substantially equal to the spacing thereof so as to provide a rotary key connection between the nut 32 and the equalizer ring unit 81, 82. The sides of the lugs 84 are rounded to permit a slight rocking motion of the equalizer ring unit about a diametrical axis. Two diametrically opposed lugs 85, on the inner periphery of the actuator plate 58, project between the rings 81 and 82 and between adjacent bolts 83 on a line perpendicular to that of the lugs 84. The lugs 85 are similar in form to the lugs 84, and serve to provide a rotary key connection between the plate 58 and the equalizer ring unit while permitting the plate to have a slight rocking motion about a diametrical axis perpendicular to that of the unit. Thus, the plate 58, although axially movable with the nut 32, is self-adjustable about two mutually perpendicular axes to compensate for misalignment and inequality in forces. As a result, the main clutch 26 is adapted to be closed with a uniform bearing pressure throughout its periphery.

It will be understood that when the main clutch 26 is open, the balls 66 in the screw device 30 act to cause the screw 31 to rotate with the nut 32 in a neutral or intermediate position. Rotation of the screw 31 relatively to the nut 32 in either direction, for example under-running because of a drag which may be termed "negative rotation", or over-running which may be called "positive rotation", will cause axial adjustment of the nut 32 and the actuator plate 58 in a corresponding direction to close the main clutch 26. The ball bearing screw device 30 and the ball spline for the plates 27 so nearly eliminate all friction that when the screw 31 is no longer subjected to a relative turning force, the springs 56 tending to open the clutch 26 are able to reverse the axial movement of the nut 32 along the screw to return the parts to their initial positions.

Figure 4:
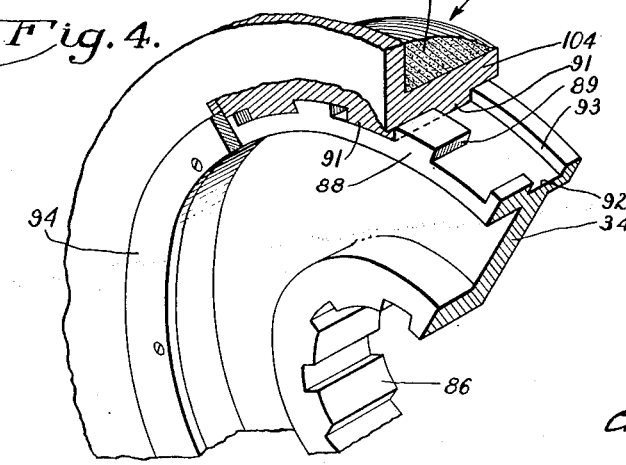
Fig. 4 is a fragmentary perspective view of the pilot clutch, and illustrates the mounting of the electromagnet.
Figure 10:
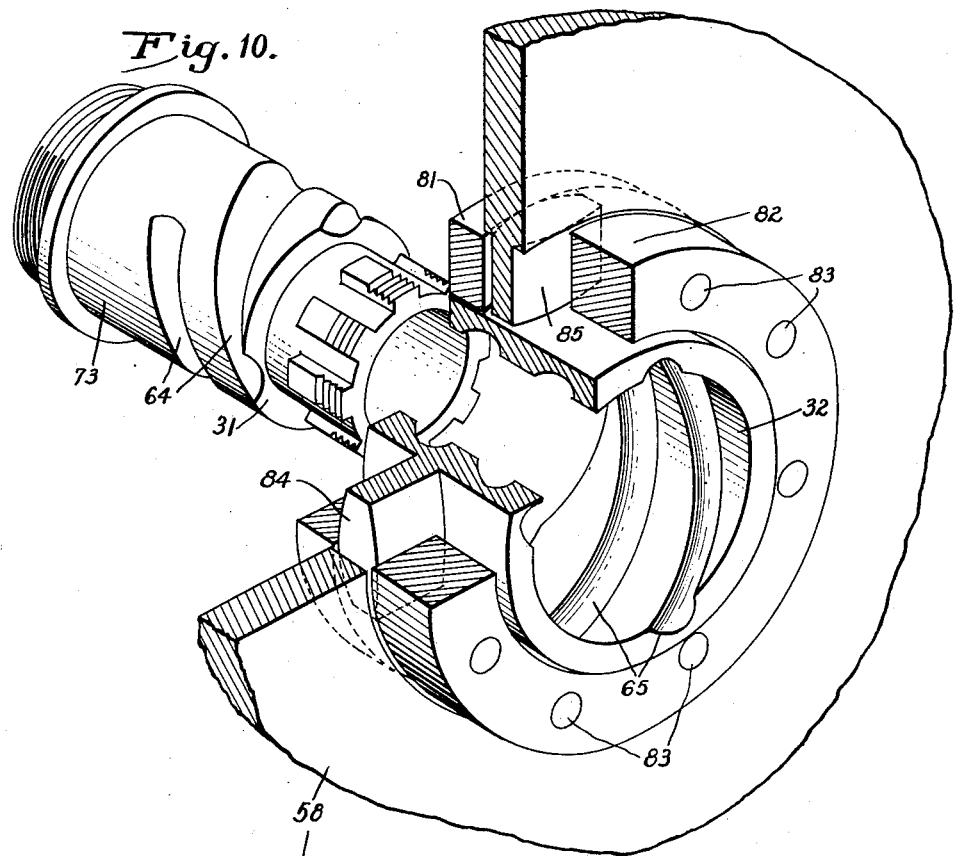
Fig. 10 is a fragmentary perspective view of the main clutch actuating means, with the elements of the ball screw device in disassembled relation.
Figure 11:
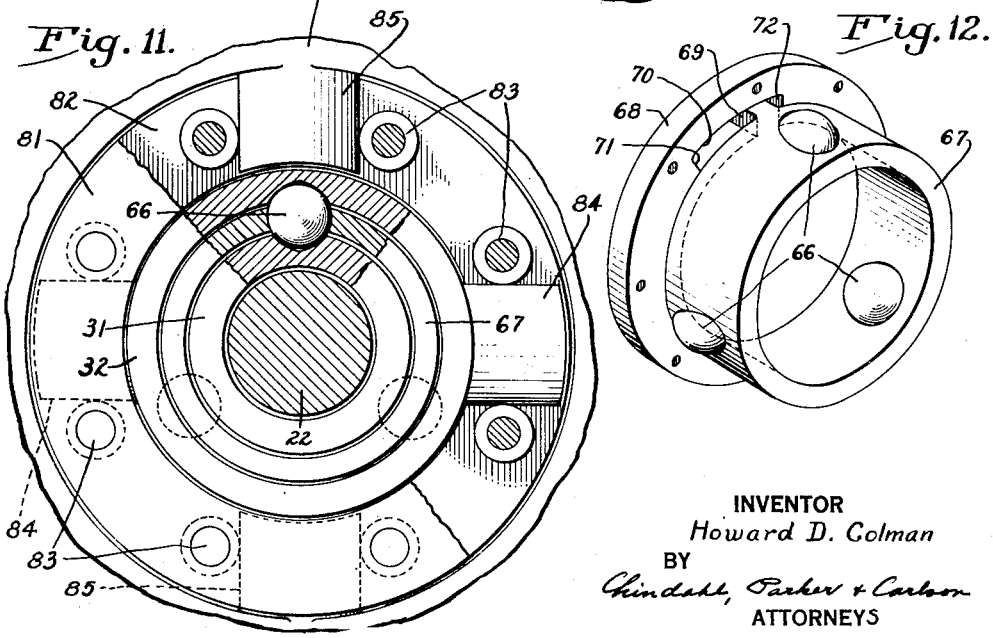
Fig. 11 is a fragmentary transverse sectional view taken substantially along line 11—11 of Fig. 1, and illustrating means for equalizing the pressure on the balls in the screw device.
Figure 12:
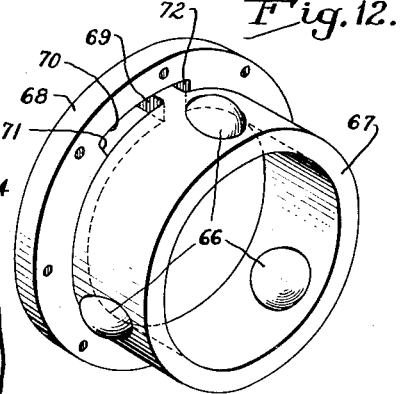
Fig. 12 is a perspective view of a retainer for the balls between the threads of the screw device, and the means for limiting its motion.

The rotation of the screw 31 is controlled by the pilot clutch 29 (see Figs. 1 and 4 to 8) which preferably is of the electro-magnetic type. The element 34 of the clutch 29 comprises an annular disk which is secured to the sleeve 73 by means of splines 86 and a clamp nut 87, and which is provided with a rim 88 formed in its outer periphery with a plurality of uniformly spaced transverse keyways 89. An annular electromagnet 90 is mounted on and about the rim 88, and has a plurality of transverse keys 91 on its inner periphery projecting into the keyways 89. The keys 91 are somewhat narrower than the keyways 89, and hence permit the electromagnet 90 to have a limited angular motion on the rim 88. The inner ends of the keyways 89 open to a peripheral groove 92, one side of which constitutes a shoulder 93 (see Fig. 4) cooperating with an opposed retainer ring 94 to secure the electromagnet 90 against axial displacement.

The other element 33 of the pilot clutch 29 comprises a disk keyed in fixed position to the driven shaft 22, and an armature 95 mounted on the outer periphery of the disk in cooperative relation with the electromagnet 90. A suitable spline connection is provided for effecting joint rotation of the disk 33 and the armature 95, but permitting free axial movement of the latter. To this end, the armature 95 is formed on its inner periphery with a plurality of uniformly spaced keys 96 (see Fig. 5) slidably disposed in transverse keyways 97 formed in the outer periphery of the disk 33.

Also formed in and opening through the disk 33 between the respective keyways 97 are a plurality of transverse bores 98. These bores are so located that they intersect the outer peripheral surface of the disk 33, but that their axes fall substantially inside of the surface. A plurality of pins 99 are slidably disposed respectively in the bores 98. Each of the pins 99 is formed intermediate the ends of the portion projecting outwardly from the periphery of the disk 33 with a longitudinal notch 100 which receives the inner periphery of the armature 95. The notches 100 are slightly greater in length than the thickness of the armature 95, and hence permit a limited relative axial movement or play of the latter. In the event that the axial movement of the armature 95 exceeds the range permitted by the notches 100, the pins 99 will be adjusted axially with the armature.

A plurality of friction plungers 101 are slidably mounted respectively in a series of radial bores 102, formed in the disk 33, and opening outwardly into the inner sides of the bores 98. The plungers 101 are pressed outwardly against the sides of the pins 99 by compression springs 103 disposed in the bores 102, and exert a frictional drag which is effective to prevent ready displacement of the pins, but which is not great enough to materially resist the movement of the armature 95 toward the electromagnet 90 when the latter is energized. Hence, each of the pins 99 constitutes a friction detent slidably disposed in the part 33 for actuation by the part 95 upon movement of the latter in the closing movement of the clutch 29 through a distance in excess of a predetermined clearance, and in the reverse movement limiting the separation of the clutch elements to such clearance.

When the electromagnet 90 is deenergized the armature 95 is free to move away a short distance the limits of which are determined by the ends of the notches 100 in the pins 99. No springs or other means are provided tending definitely to separate the electromagnet 90 and the armature 95. On the contrary, the armature 95 is permitted a free-floating movement between the limits defined by the pins 99, and is caused to separate slightly from the electromagnet 90 due to the relative rotation of the latter when the magnetic pull is discontinued. Thus the armature 95 may contact with the electromagnet 90, and is never separated from the latter by an air gap greater than that permitted by the confines of the notches 100. The power requirements of the electromagnet 90 are therefore much more constant in closing the clutch 29 and then maintaining the latter in closed position than when both an air gap and an opening pressure must be overcome.

The electromagnet 90 in its preferred form comprises inner and outer concentric rings 104 and 105 of suitable material, and an annular magnetic coil 106 interposed therebetween. An outer peripheral flange 107 integral with the ring 104 is secured to the outer ring 105, and constitutes a backing plate for one side of the coil 106. A thin sheet 108 of non-magnetic material is interposed between the outer ring 105 and the flange 107 to interrupt the flux circuit, so that any residual magnetism in the electromagnet 90 will be quickly eliminated after the latter is deenergized. It will be evident that the free sides of the rings 104 and 105 constitute pole faces adjacent the armature 95. A ring 109 of non-magnetic friction material adapted for engagement by the armature 95 is seated in notches 109ᵃ formed in the inner edges of the pole faces, and serves to enclose the adjacent side of the coil 106. The pole faces are substantially flush with the outer surface of the ring 109, but in use are likely to recede slightly due to wear.

The maximum possible air gap between the armature 95 and the friction ring 109, which constitute the coacting friction elements of the pilot clutch 29, remains constant regardless of wear. In the event of wear on the ring 109, movement of the armature 95 under the influence of the electromagnet 90 will cause a corresponding adjustment of the pins 99 against the action of the friction plungers 101. The length of the notches 99 exceeds the width of the armature 95 by an amount slightly greater than the sum of the end plays of the driving and driven members 21 and 22. This difference defines the maximum possible air gap, which is possible only when the end plays are additive. The possible air gap is much less and comparatively small when the end plays offset each other. It will be understood that the armature 95 will not necessarily move from the electromagnet 90 through the full extent permitted by the notches 99.

Mounted on the electromagnet 90 for rotation therewith, and extending in spaced relation about the armature 95 is a ring 110 (see Figs. 1, 6, and 7) of insulating material which is formed with an annular internal disk 111 extending in closed space relation about the disk 33. The disk 111 constitutes a carrier for a plurality of contact slip rings in the electric circuits for energizing the electromagnet 90. In the present instance, three slip rings 112, 113 and 114 are provided so that either of two circuits through the coil 106 may be utilized. The slip rings are mounted on the disk 111 in concentric relation about the shaft 22. One circuit (see Fig. 14) proceeds from the outer ring 112, through a line 115, the coil 106 and a line 116 to the inner ring 114. The other circuit has two parallel branches, one proceeding from the intermediate ring 113 through a line 117, a normally closed switch 118 and a line 119 to the line 115, and the other proceeding from the line 117 through a line 120, an electrical resistance element 121, and a line 122 to the line 115. From the line 115, the other circuit continues through the coil 106 and the line 116 to the inner ring 114.

Three brush contacts 123, 124, and 125 are spring pressed respectively into sliding engagement with the slip rings 112, 113, and 114. These contacts are slidably disposed in guideways 126 (see Fig. 8) which extend perpendicularly to the contact faces of the rings 112, 113, and 114, and which are formed in an insulating block 127 mounted in a fixed position on the inside of the housing 20. Individual leaf springs 128, anchored to the block 127, are connected at their free ends to the brush contacts 123, 124, and 125, and urge the latter outwardly along the guideways 126.

The resistance element 121 preferably is annular in form, and is mounted in an annular groove 129 in the outer periphery of the insulating ring 110.

The two circuits through the coil 106 are selectively available as will be more fully described hereinafter. Normally, the electromagnet 90 has sufficient power, regardless of which circuit is selected, to close the pilot clutch 29 with enough force to effect the closing of the main clutch 26 against the resistance of the springs 56. However, if the switch circuit is selected, and the switch 118 is opened, the exciting current must pass through the resistance element 121 and the coil 106 in series. In this event, the power of the electromagnet 90 is greatly reduced, and, while still sufficient to hold the pilot clutch 29 in closed position, is not great enough to effect closing of the main clutch 26.

The switch 118 is adapted to be opened automatically when the driven shaft 22 overruns the motor shaft 21. In the present instance, this is accomplished by utilizing the pilot clutch 29 to adjust the angular position of the electromagnet 90 on the rim 88 to the extent permitted by the grooves 89. An annular plate 130 is secured in fixed position against one side of the disk 34, and extends outwardly beyond the outer periphery of the electromagnet 90. A portion of the outer margin of the plate 130 is cut away as indicated at 131 (see Figs. 6 and 7), and is bent laterally to define spaced lugs 132 and 133. A housing 134 enclosing the switch 118 is rigidly mounted on the outer periphery of the insulating ring 110 for rotary movement with the electromagnet 90, and extends in spaced relation between the lugs 132 and 133. The switch 118 comprises a fixed contact 135 mounted on a bracket 136, and a movable contact 137 fixed on the free end of a leaf spring 138 anchored to a bracket 139. A coiled tension spring 140, anchored at opposite ends to the lug 132 and the housing 134, tends to rotate the electromagnet 90 into the position in which it is normally held by the frictional drag of the pilot clutch 29 when the electromagnet tends to drive the armature 95. Fixed on the other lug 133, and projecting tangentially of the plate 130 into the housing 134 for engagement with the free end of the leaf spring 138 to open the switch 118 is a pin 141. It will be evident that when the armature 95 tends to rotate the electromagnet 90, the latter will be adjusted angularly against the action of the spring 140 through a limited extent, thereby causing the pin 141 to open the switch 118. If the excitation of the electromagnet 90 is placed under the control of the switch 118, the resistance element 121 will thereupon reduce the holding power as described, but not to a point where it is unable to overcome the spring 140.

Provision is made for confining a suitable lubricant in the screw device 30 and the bearing 74, and also to prevent any lubricant that may leak therefrom or from the gear case 24 along the shaft 22 into the housing 20 from entering between the friction surfaces of the main and pilot clutches 26 and 29. Referring first to the screw device 30, one end of the ball space is closed by means of an oil seal ring 142 (see Fig. 1) which is secured against the outer side of the ring 68 by a retainer 143, and which bears against the inner peripheral surface of the adjacent end of the ball bearing sleeve 75. A similar ring 144 is secured to the disk 34 by a retainer 145, and bears in the adjacent end of the outer raceway 65 to seal the other end of the ball space.

In the ball bearing 74, an oil seal ring 146 is positioned in an annular notch 147 formed in the outer peripheral edge of one end of the inner sleeve 75, and bears against the inside of an annular guard plate 148 tightly secured to the adjacent end of the outer sleeve 77. The other end of the ball space is sealed by a flat annular spring plate 149 which is secured at its outer peripheral edge in a notch in the outer bearing sleeve 77, and the inner peripheral edge of which is sprung into engagement in a notch in the inner sleeve 75.

Lubricant escaping from the bearing 74 or leaking inwardly along the shaft 22 to the clutch plate 28 is prevented from entering the main clutch 26 by a series of overlapping outer and inner oil guards 150 and 151, and 152 and 153. The outer oil guards 150 and 151 are of an annular truncated conical form, with their base ends secured respectively to the adjacent inner sides of the plates 37 and 51, and with their small ends extending inside of the movable clutch plates 27 to points closely adjacent the opposite sides of the intermediate plate 28. A plurality of annularly spaced apertures 154 and 155 open from within the guards 150 and 151 respectively through the plates 37 and 51, and are outwardly inclined relative to the axis of rotation to facilitate the removal of collecting lubricant therethrough by centrifugal force. The inner guards 152 and 153 are also of an annular truncated form, and are secured at their small ends respectively to opposite sides of the intermediate plate 28. Hence, any lubricant that may find its way to either side of the plate 28 will be baffled outwardly along the guards 152 and 153 into the guards 150 and 151, and from there will be expelled through the apertures 154 and 155 to the external spaces where it can do no harm.

Lubricant finding its way between the elements of the pilot clutch 29 is adapted to be caught by an annular undercut flange 156 formed on the inner face of the disk 34, and overlapping the adjacent end of the disk 33. A plurality of annularly spaced apertures 157 opening from within the flange 156 through the disk 34 and the plate 130, and inclined outwardly relative to the axis of rotation are provided to expel the lubricant to the space outside of the clutch 29. The outer end of the disk 33 is formed about the bearing 39 with an annular recess 158 which is flared outwardly to throw any lubricant leaking thereto beyond the central opening of the disk 111.

The clutch mechanism just described may be adapted to many different uses. If intended for use merely as a separable connection in a power transmission wherein either of the shafts 21 and 22 is adapted to drive the other in either direction, the electromagnet 90 may be rigidly fixed on the disk 34, and the switch 118 and associated parts may be dispensed with. The clutch mechanism is particularly adapted for use in the power drives of motor vehicles. Although of a unitary character, it is adapted for optional control whereby to obtain either a conventional drive, or automatic free wheeling under the control of the accelerator.

Any suitable type of control may be provided. In one form, illustrated in Fig. 15, the operating parts are mainly mechanical. The preferred form of the control, however, is fully electrical as illustrated in Fig. 14.

Referring first to Fig. 14, the conventional drive is subject to the actuation of a clutch pedal 159 pivotally mounted on the floor board 160 of the vehicle, and supplanting the mechanical clutch pedal ordinarily employed. The pedal 159 normally is urged upwardly by a spring 161. Rigid with the pedal 159 is a switch arm 162 carrying a contact 163 which in its uppermost position engages a fixed contact 164. Upon depressing the pedal 159, the contact 163 is moved from the contact 164 onto a rheostat 164ᵃ, then progressively along the latter to gradually increase the resistance, and finally into its lowermost position to break the electrical connection. Since the forces which it is required to handle are very small as compared with those of the ordinary clutch pedal, the pedal 159 is made in a design similar to that of the usual throttle pedal.

Assuming that the lever 159 is up so that the contacts 163 and 164 are in engagement, the conventional drive circuit for the electromagnet 90 is completed as follows: from the battery 165, through a line 166, the arm 162, the contacts 163 and 164, a line 167, a choke coil 168, a line 169, a switch 170, a line 171, the slip ring 112, the line 115, the coil 106, the line 116, the slip ring 114, a line 172 to the ground. When the pedal 159 is in its lowermost position, the circuit is broken.

Normally, the clutch pedal 159 is operated in the same manner as the ordinary clutch pedal. Thus, it is fully depressed to open the clutch 26 and is gradually released to close the clutch. In the initial upward movement of the pedal 159 into an intermediate position, the circuit is closed immediately from the contact 163, through the rheostat 164ᵃ and a line 173 to the line 169, thereby shunting the choke coil 168. Obviously, the resistance in the circuit is progressively decreased, and hence the force of the clutch engagement is correspondingly increased as the pedal 159 continues its upward movement. This characteristic is of considerable advantage in that it permits substantially the entire stroke of the pedal 159 to be utilized in controlling the action of the clutch, for example to allow a certain amount of slippage to occur. The ordinary clutch pedal does not afford the same degree of control since only a small portion of its stroke is available to vary the pressure on the friction surfaces of the clutch, and since it assumes some intermediate position, constantly subject to change and difficult to ascertain, when the clutch engages.

The switch 118 is not included in the conventional drive circuit, and hence the pilot clutch 29 will close the main clutch 26 regardless of whether or not the driven shaft 22 initially is over-running the motor shaft 21.

The clutch mechanism may be rendered automatic to obtain free wheeling by shifting the control from the pedal 159 to a pedal 174 connected to the fuel throttle. This may be accomplished by opening the switch 170, which is mounted on the dash 175, to interrupt the conventional drive circuit.

The throttle pedal 174 is pivotally mounted on the floor board 160, and normally is urged toward its uppermost position by a spring 176. Rigid with the pedal 174 is a suitable switch arm 177 carrying a contact 178 which is movable from an open position downwardly over a rheostat 179 of progressively decreasing resistance. Assuming that the clutch pedal 159 is in its uppermost position and that the throttle pedal 174 is partially depressed, the free wheeling circuit then is completed as follows: from the battery 165, through the line 166, the arm 162, the contacts 163 and 164, the line 167, the choke coil 168, the line 169, the rheostat 179, the contact 178, the arm 177, a line 180, the slip ring 113, the line 117, the switch 118, the line 119, the coil 106, the line 116, the slip ring 114, and the line 172 through the ground back to the battery 165. If the driven shaft 22 is not over-running the motor shaft 21, the electromagnet 90 will be energized to its full power to close the main clutch 26 just as when in conventional operation. However, if the shaft 22 is over-running the motor shaft 21, the electromagnet 90 will be adjusted angularly to open the switch 118, and thereby require the current to flow from the line 117, through the line 120, the resistance element 121, and the lines 122 and 115 to the coil 106. Thereupon, the power of the pilot clutch 29, although sufficient to maintain the switch 118 open, is reduced to such an extent that the main clutch 26 will remain open.

Thus, the operation of the main clutch 26 is under the joint automatic control of the throttle pedal 174 and the relative speed of the motor 23 and the vehicle. When the throttle pedal 174 is depressed, the circuit for the electromagnet 90 is closed. If the speed of the motor 23 is less than that of the vehicle, the main clutch 26 will remain open, and free wheeling will occur. Upon acceleration of the motor 23, the main clutch 26 will close if and when the speeds of the driving and driven shafts 21 and 22 are synchronized. Hence, there can be no appreciable shock or clutch slippage when the motor 23 picks up the load, and therefore no appreciable wear on the friction surfaces due to free wheeling. When the throttle pedal 174 is up, the main and pilot clutches 26 and 29 will both be open, and hence free wheeling will occur if the vehicle is in motion. Although the clutch mechanism is under the control of the throttle pedal 174, the main clutch 26 may be opened at any time by fully depressing the clutch pedal 159.

The choke coil 168 is provided in the free wheeling circuit, so that, when the throttle pedal 174 is depressed, there will be a short delay in the closing of the main clutch 26 to allow time for the motor 23 to accelerate slightly before the drive connection is established. The purpose of this delay is to prevent any likelihood of the motor 23 becoming stalled when the vehicle is not in motion. The duration of the delay is varied automatically in accordance with the degree of throttle opening by reason of the rheostat 179, and hence with the rate at which the motor 23 is accelerated. This is due to the fact that the choke coil 168 will build up to a given current more quickly when the resistance is reduced or cut entirely than when the latter is relatively high. When the throttle pedal 174 is but slightly depressed, only a little power is given to the motor 23, and hence the delay is relatively prolonged. Conversely, when the throttle pedal 174 is fully depressed, the rheostat 179 is cut out of the circuit, so that the delay is comparatively slight. For intermediate positions of the throttle pedal 174, the delay is varied accordingly.

Not only does the rheostat 179, under the control of the throttle pedal 174, vary the delay of the clutch engagement, but it also determines the final value of the electric current through the electromagnet 90, and hence the pressure of the clutch engagement in accordance with the power delivered by the motor 23. This has the advantage that, when starting from rest, if the throttle pedal 174 is depressed but a short distance so that the motor 23 is delivering comparatively little power, the main clutch 26 will be engaged with a corresponding pressure, thereby permitting more slippage, and hence affording a smooth and easy start and avoiding any possibility of stalling.

In some instances, as for example when driving in heavy traffic, or when starting after a traffic signal change, it may be desired to engage the clutch 26 more quickly than normally permitted by the choke coil 168. This may be accomplished under the joint control of the two pedals 159 and 174, i. e. by first fully depressing the clutch pedal 159, then depressing the throttle pedal 174 to speed up the motor 23 and decrease the resistance of the rheostat 179 in the clutch circuit, and then allowing the clutch pedal to rise graudally as in the conventional drive. Thus, the free wheeling circuit will be closed without passing through the choke coil 168, and the delay in engaging the clutch 26 normally caused by the coil will be avoided.

The conversion of the control from free wheeling to a conventional drive or vice versa is accomplished simply by closing or opening the dash switch 170. In the first instance, the throttle pedal 174 is partially depressed to speed up the motor 23 (assuming the vehicle is in motion) so as to approximately synchronize the speeds of the driving and driven shafts 21 and 22; then the clutch pedal 159 is completely depressed to open the clutch circuit; now the switch 170 is closed to prepare the conventional drive circuit; and finally the clutch pedal is gradually released to gently engage the clutch 26. In this manner, the conversion may be accomplished without shock. If a sudden need should arise to utilize the braking power of the motor 23 in order to avoid an accident, the switch 170 may be closed without depressing either pedal, and in this event the electromagnet 90 will be fully energized immediately, and the clutch 26 will be closed under full pressure. A considerable shock may result if the vehicle is moving rapidly and coasting, but this shock is of course acceptable if the object sought is to avoid an accident, and in any event is the worst that can result from mishandling of the control by the operator, and is not as severe as that produced when closing the jaw clutch to eliminate the over-running clutch in commonly used free wheeling systems to connect driving and driven parts having a high velocity relative to each other. The shock may be reduced or eliminated by momentarily accelerating the motor 23 just before the switch 170 is closed.

Figs. 15 and 16 illustrate a modified mechanical control mechanism for the pilot clutch 29. In this form, the electromagnet circuits across the slip rings 112, 113, and 114 are the same as in the first form, and hence are identified by the same reference characters. The mechanical form comprises a clutch pedal 181 and a throttle pedal 182, both of which are pivotally mounted on the floor board 160 of the vehicle, and a carbon pack rheostat 183 taking the place of the rheostats 164ᵃ and 179. Both pedals 181 and 182 are spring pressed into their uppermost positions. The rheostat 183 is adapted to open when released, and to provide a gradually decreasing resistance as it is progressively compressed. It is under the exclusive control of the clutch pedal 181 when the system is in conventional drive, and under the joint or individual control of both pedals 181 and 182 when the system is set for free wheeling.

When the clutch pedal 181 is released, the conventional drive circuit is adapted to be completed from the battery 184, through a line 185, the carbon pack rheostat 183, a line 186, a switch 187 corresponding to the switch 170, a line 188 to the slip ring 112, and from there through the coil 106 back to the battery as previously described. The free wheeling circuit is always established from the line 186 to the slip ring 113, and from there through either the switch 118 or the resistance element 121 to the coil 106, but is ineffective as long as the switch 187 is closed. Thus, if the switch 118 were to be opened, the conventional drive circuit paralleling the resistance element 121 would still ensure a full energization of the electromagnet 80.

The movable element of the rheostat 183 has a plunger 189 pivotally connected to an eccentric pin 190 on one end of a rock shaft 191 suitably journaled in a fixed position. Fixed on the shaft 191 are two laterally extending arms 192 and 193. The free end of one arm 192 is rounded, and is connected by a pin 194 to a contractile spring 195 tending to rock the shaft 191 in a direction to compress the rheostat 183. The other arm 193 is adapted for engagement by a prong 196 extending rearwardly from the clutch pedal 181 to rock the shaft 191 against the action of the spring 195.

Suitable means is provided for retarding the rocking of the shaft 191 under the action of the spring 195, but is rendered inoperative when the clutch pedal 181 is actuated to control the clutch 26. In the present instance, this means comprises a dash pot 196 having a diaphragm 197 permitted to move freely and quickly in one direction, but restricted to a comparatively slow movement in the opposite direction by the action of a check valve with an exhaust bleed opening. A lever 198 is pivotally connected at one end to the diaphragm 197, and at its other end is formed with a transverse notch 199 adapted to engage the free rounded end of the arm 192. The lever 198 is urged toward the arm 192 by a contractile spring 200. A prong 201 extending rearwardly from the clutch pedal 181 is adapted to engage the toe of the lever 198 to disengage the notch 199 from the arm 192 against the action of the spring 200 in the initial downward movement of the clutch pedal.

The clutch pedal 181 affords a conventional control in the same manner as the ordinary standard pedal. When the pedal 181 is depressed, the prong 201 disengages the lever 198, and the prong 196 acts against the arm 193 to relieve the pressure on the rheostat 183, and thereby to open the conventional drive circuit. As a result, the main clutch 26 is opened. When the clutch pedal 181 is up, the rheostat 183 is compressed, and hence the main clutch 26 is closed at full pressure. The present control is distinguished from the ordinary control in that, as the pedal 181 is gradually released, the shaft 191 is permitted to rock so as to vary the pressure on the rheostat 183 progressively over substantially the entire stroke of the pedal, thereby affording means for accurately adjusting the pressure of clutch engagement to suit the driving requirements.

The clutch 26 may always be opened by the pedal 181, and may also be placed under the control of the throttle pedal 182 for free wheeling. To this end, a link 202 is pivotally connected at one end to the rear of the throttle pedal 182, and at the other end has a pin 203 with a square longitudinal notch 204 in one side adapted to be positioned for engagement with a third arm 205 fixed on the rock shaft 191. When the throttle pedal 182 is released, the pin 204 engages the arm 205 to rock the shaft 191, and thereby to relieve the pressure on the rheostat 183. Conversely, upon depressing the throttle pedal 182, the arm 205 is released to permit pressure to be applied to the rheostat 183. Assuming that the clutch pedal 181 is permitted to remain in its uppermost position, the lever 198 will remain in engagement with the arm 192, and hence the dash pot 196 will damp the movement of the shaft 191 so as to delay the closing of the clutch 26 until the motor 23 has accelerated slightly in response to the initial depression of the throttle pedal 182. However, the dash pot 196 is incapable of retarding the reverse rotation of the shaft 191 upon releasing the throttle pedal 182. The delay in closing the clutch 26 may be eliminated, if desired, by first partially depressing the clutch pedal 181 to disengage the lever 198, and then depressing the throttle pedal 182 to release the arm 205 for follow up movement.

The pressure of clutch engagement varies in accordance with the position of the throttle pedal 182. Thus, as the pedal 182 is progressively depressed, the arm 205 follows the pin 203, as will be evident in Fig. 16, and effects a corresponding decrease in the resistance in the exciting circuit. Consequently, when the fuel throttle is wide open so that the motor can develop a heavy driving torque, the pressure of clutch engagement is at a maximum. For smaller throttle openings, correspondingly lighter pressures are obtained.

The conversion from conventional drive to free wheeling and vice versa is effected respectively by opening the switch 187 and interposing the pin 203 in the path of the arm 205 and by closing the switch and withdrawing the pin out of the reach of the arm. Thus, the switch 187 is operable by a rock shaft 206 on which is also fixed an arm 207 having a longitudinal slot 208 slidably receiving the pin 203. A button 209 adjustable on the dash is connected through a wire 210 to the arm 207. The button 209 is adapted to be yieldingly secured in either of two positions. In one position of the button, the system is set for free wheeling. In the other position, the arm 207 serves to hold the pin 203 out of the range of the arm 205.

When set for free wheeling, the clutch 26 may be opened by either depressing the pedal 181 or releasing the pedal 182. If the clutch pedal 181 is fully up, depressing the throttle pedal 182 will effect a delayed closing of the clutch 26. If the clutch pedal 181 initially is partially depressed to release the arm 192 from the lever 198, the clutch 26 will be closed immediately upon depressing the throttle pedal 182. Upon releasing both pedals 181 and 182, engagement between the arm 192 and the lever 198 will be automatically reestablished.

I claim as my invention:

1. A clutch mechanism comprising, in combination with a driving member and a normally driven member, a flywheel secured to said driving member and having an annular rim, an annular plate secured to said flywheel, two spaced annular friction disks splined to the interior of said rim for movement axially of said driving member, spring means tending to separate said disks axially respectively against said flywheel and said plate, a friction disk located between said first mentioned disks and splined for axial movement on said driven member, a plurality of pins each having opposed shoulders movable in opposite directions respectively into engagement with the outer sides of said first mentioned disks to compress all of said disks selectively against said flywheel or said plate, and means for actuating said pins out of an intermediate position in either direction.

2. A clutch mechanism comprising, in combination with a driving member and a normally driven member, two opposed stops mounted in fixed position on one of said members and spaced axially thereof, two friction disks splined for axial movement between said stops on one of said members, a friction disk splined for axial movement between said first mentioned disks on the other of said members, spring means tending to separate said disks, and actuating means movable in opposite directions to compress said disks into driving engagement respectively against one or the other of said stops.

3. A clutch mechanism comprising, in combination with a driving member and a normally driven member, two opposed stops mounted in fixed position on one of said members and spaced axially thereof, two friction disks mounted for independent axial movement between said stops, ball bearing splines for connecting said disks for rotation with one of said members, a friction disk splined for axial movement between said first mentioned disks on the other of said members, spring means tending to separate said disks, and actuating means movable in opposite directions to compress said disks into driving engagement respectively against one or the other of said stops.

4. A clutch mechanism comprising, in combination with a driving member and a normally driven member, two opposed stops mounted in fixed position on one of said members and spaced axially thereof, two friction disks splined for axial movement between said stops on one of said members, a friction disk splined for axial movement between said first mentioned disks on the other of said members, spring means tending to separate said disks, two outwardly flared annular oil guards mounted respectively on said stops and extending through said first mentioned disks closely to opposite sides of said last mentioned disk, said stops being formed with oil outlets immediately within the confines of said guards, two outwardly flared annular oil guards mounted respectively on opposite sides of said last mentioned disk and extending into said first mentioned guards, and actuating means movable in opposite directions to compress said disks into driving engagement respectively against one or the other of said stops.

5. A clutch mechanism comprising, in combination with a driving member and a normally driven member, a clutch for connecting said members, a triple thread screw element and a mating nut element, one of said elements being constrained for rotation with said driving member and being axially movable to actuate said clutch, the other of said elements being anchored against axial movement, three ball bearings in engagement between the respective threads of said elements, means for retaining said balls in a common transverse plane, and means for rotating said elements relatively to each other.

6. A clutch mechanism comprising, in combination with a driving member and a normally driven member, a clutch for connecting said members and having driving and driven clutch members movable axially in opposite directions into driving engagement, a screw element and a nut element having mating screw threads, an actuator for said clutch having a universal rocking connection with one of said elements, the other of said elements being anchored against axial movement, and means for rotating said other element relatively to said one element out of an intermediate position in either direction to effect the closing of said clutch.

7. A clutch mechanism comprising, in combination with a driving member and a normally driven member, a clutch having coacting driving and driven friction disks splined for axial movement respectively on said members and being compressible in either direction into driving engagement, spring means tending to separate said disks, a screw, an end thrust anti-friction bearing anchoring said screw against axial movement in either direction relative to said driving member, a nut rotatable about said screw, a plurality of balls interposed between the threads of said screw and nut, an actuator plate mounted on said nut for rotation and axial movement therewith and being movable axially in either direction out of an intermediate position to close said clutch, and means for rotating said screw in said nut, said spring means tending to return said actuator plate into said intermediate position when said last mentioned means is rendered inoperative.

8. A clutch mechanism comprising, in combination, a main clutch, an anti-friction screw device movable in either direction out of an intermediate position to close said main clutch, and a pilot clutch for actuating said screw device.

9. A clutch mechanism comprising, in combination, a driving shaft and a normally driven shaft, a main clutch having coacting clutch members respectively connected to said shafts and having spring means tending to open said members, an anti-friction screw device having a screw element, a nut element and a plurality of balls in bearing engagement therebetween, said screw device being operable in either direction out of an intermediate position to close said clutch against the action of said spring means, a pilot clutch having coacting clutch members respectively connected to said driven shaft and one of said elements and operable to actuate said screw device in one direction when said driving shaft overruns said driven shaft and in the other direction when said driven shaft overruns said driving shaft, and means for closing said pilot clutch.

10. A clutch mechanism comprising, in combination, a driving shaft and a normally driven shaft, a main clutch having coacting clutch members respectively connected to said shafts and having spring means tending to open said members, an anti-friction screw device having a screw element, a nut element and a plurality of balls in bearing engagement therebetween, said screw device being operable in either direction out of an intermediate position to close said clutch against the action of said spring means, a pilot clutch having coacting clutch members respectively connected to said driven shaft and one of said elements and operable to actuate said screw device in one direction when said driving shaft overruns said driven shaft and in the other direction when said driven shaft overruns said driving shaft, means for normally closing said pilot clutch, and means available at will for rendering said last mentioned means ineffective when said driven shaft overruns said driving shaft.

11. A clutch mechanism comprising, in combination with a driving shaft and a driven shaft, a clutch for connecting said shafts, power multiplying means operable in either direction out of an intermediate position to close said clutch, an electromagnetic pilot clutch for actuating said means upon relative rotation between said shafts, and means for normally closing said pilot clutch, said last mentioned means being adjustable at will to automatically prevent said pilot clutch from being closed when said driven shaft overruns said driving shaft.

12. A clutch mechanism comprising, in combination, a driving shaft and a normally driven shaft, a main clutch having coacting clutch members respectively connected to said shafts and having spring means tending to open said members, power multiplying means operable in either direction out of intermediate position to close said clutch and tending to return into said position in response to said spring means, an electromagnetic pilot clutch having an electromagnet and an armature connected respectively to said means and said driven shaft and constituting coacting pilot clutch members, an exciting circuit for said electromagnet including a resistance and a switch in parallel, and means for closing said circuit, said switch being adapted to open automatically in response to overrun by said driven shaft to reduce the power of said electromagnet below that required to overcome said spring means.

13. A clutch mechanism comprising, in combination with a driving shaft and a coaxial driven shaft, a member mounted for rotation with one of said shafts, an annular electromagnet mounted for limited rotation on said member, an armature mounted for rotation on the other of said shafts, said electromagnet and armature constituting clutch elements movable axially into and out of coacting engagement and adapted upon relative rotation of said shafts in opposite directions to adjust said electromagnet respectively in its opposite limit position on said member, an electric circuit for energizing said electromagnet to effect full driving pressure between said elements and including a switch adapted to be opened automatically upon movement of said electromagnet into one limit position, spring means tending to retain said electromagnet in its other limit position, and a parallel circuit for energizing said electromagnet to effect a drag between said elements of sufficient force to overcome said spring means when said switch is open.

14. A clutch mechanism comprising, in combination with a driving shaft and a coaxial driven shaft, a member mounted for rotation with one of said shafts, an annular electromagnet mounted for limited rotation on said member, an armature mounted for rotation on the other of said shafts, said electromagnet and armature constituting clutch elements movable axially into and out of coacting engagement and adapted upon relative rotation of said shafts in opposite directions to adjust said electromagnet respectively in its opposite limit position on said member, electric circuits for energizing said electromagnet to effect engagement between said elements, and means automatically responsive to adjustment of said electromagnet respectively into said limit positions for varying the power of said electromagnet, 15. A clutch mechanism comprising, in combination with a driving member and a driven member, an annular electromagnet mounted for rotation with one of said members, an annular armature mounted for rotation with the other of said members, said electromagnet and armature constituting friction clutch elements movable axially into and out of driving engagement, means for energizing said electromagnet, and means for limiting the permissible extent of separation of said elements and being self-adjustable to compensate for wear on said elements.

16. A clutch mechanism comprising, in combination, an electromagnetic clutch having an electromagnet and a coacting armature relatively movable thereto, an energizing circuit for said electromagnet, and a choke coil and a variable resistance switch in series in said circuit.

17. A clutch mechanism for the drive from a motor having an adjustable fuel throttle, said mechanism comprising, in combination, an electromagnetic clutch having an electromagnet and a relatively movable armature, an energizing circuit for said electromagnet, said circuit including a normally closed switch and a normally open variable resistance switch in series, a manual actuator for said throttle, said last mentioned switch being operable by said actuator to close said circuit and to decrease the resistance as said throttle is opened progressively, and a manual actuator for opening said first mentioned switch.

18. A clutch mechanism comprising, in combination, a main friction clutch, power multiplying means for actuating said clutch, an electromagnetic pilot clutch for actuating said means, and an energizing circuit for said pilot clutch, said circuit including a fixed contact and a rheostat in parallel, and a movable contact normally on said fixed contact and movable in one direction from said fixed contact onto and along said rheostat to insert a progressively increasing resistance in said circuit, and then into an open position.

19. A clutch mechanism comprising, in combination, a main friction clutch, power multiplying means for actuating said clutch, an electromagnetic pilot clutch for actuating said means, and two parallel circuits selectively available for energizing said pilot clutch, one circuit including in series a normally closed variable resistance switch, and a normally closed conversion switch, and the other circuit including in series said first mentioned switch and a normally open variable resistance switch.

20. A clutch mechanism for the drive from a motor having an adjustable fuel throttle, said mechanism comprising, in combination, an electromagnetic friction clutch, and an energizing circuit for said clutch, said circuit including a normally open variable resistance switch operable by said throttle to decrease the resistance as the throttle is opened.

21. A clutch mechanism comprising, in combination, an electromagnetic clutch having an electromagnet and a relatively movable armature, an energizing circuit for said electromagnet and including a variable resistance, means normally operable to decrease said resistance, mechanical means for controlling said last mentioned means and progressively adjustable to permit corresponding degrees of operation of said first mentioned means, and a time delay device for damping the operation of said first mentioned means.

22. A clutch mechanism comprising, in combination, an electromagnetic clutch having an electromagnet and a relatively movable armature, an energizing circuit for said electromagnet and including a variable resistance, means normally operable to decrease said resistance, mechanical means for controlling said last mentioned means and progressively adjustable to permit corresponding degrees of operation of said first mentioned means, a time delay device for damping the operation of said first mentioned means, means available at will for rendering said second mentioned means inoperative, and a second mechanical means progressively adjustable to permit corresponding degrees of operation of said first mentioned means while maintaining said time delay device inoperative.

23. A clutch mechanism comprising, in combination, a main friction clutch, power multiplying means for actuating said clutch, an electromagnetic pilot clutch for actuating said means, and a circuit for energizing said pilot clutch and including a variable resistance, means including a manual actuator for closing said circuit and progressively decreasing said resistance, a time delay device for retarding said decrease in resistance, and a second manual actuator available at will for rendering said time delay device inoperable.

24. A clutch mechanism comprising, in combination with a driving member and a normally driven member, a plurality of axially spaced friction disks adapted for relative movement into and out of engagement, alternate disks being connected respectively to said members, two outwardly flared annular oil guards mounted on one of said members respectively at opposite sides of said disks, two outwardly flared annular oil guards mounted for rotation with the other of said members and extending oppositely into said first mentioned guards, and means for actuating said disks into driving engagement, said guards being operable to deflect and direct oil out of said clutch mechanism.

25. A clutch mechanism comprising, in combination with a driving member and a normally driven member, a clutch for connecting said members and having driving and driven clutch members movable axially into and out of driving engagement, a screw element and a nut element having coacting screw threads, an actuator for said clutch having a universal rocking connection with one of said elements, the other of said elements being anchored against axial movement in one direction, and means for rotating said other element relatively to said one element to effect the closing of said clutch.

26. A clutch mechanism comprising, in combination with a driving member and a driven member, a main clutch having a plurality of friction elements adapted to be pressed axially into frictional driving engagement, certain of said elements being connected to one of said members and others of said elements having an anti-friction ball spline connection with the other of said members, an anti-friction non-locking ball screw device movable in either direction out of an intermediate position to close said main clutch, and a pilot clutch for actuating said screw device.

27. A clutch mechanism comprising, in combination with a driving shaft and a driven shaft, a clutch for connecting said shafts, power multiplying means operable in either direction out of an intermediate position to close said clutch, a pilot clutch for actuating said means upon relative rotation between said shafts, and means for normally closing said pilot clutch, said last mentioned means being adjustable at will to automatically prevent said pilot clutch from being closed when said driven shaft overruns said driving shaft.

28. A clutch mechanism comprising, in combination, a driving shaft and a normally driven shaft, a main clutch having coacting clutch members respectively connected to said shafts, and an electromagnetic pilot clutch for operating said main clutch, said pilot clutch comprising an electromagnet for operating said main clutch and an armature connected to said driven shaft, an exciting circuit for said electromagnet including a resistance and a switch in parallel, and means for closing said circuit, said switch being adapted to be opened automatically in response to overrun by said driven shaft to reduce the power of said electromagnet below that required to close said main clutch.

29. In a clutch mechanism, in combination with a driving member and a driven member, a disk secured for rotation with one of said members, an electromagnet mounted on said disk for relative rotation through a limited degree, spring means tending to urge said electromagnet into one position of adjustment on said disk, a switch controlled by said electromagnet and adapted to be actuated automatically between open and closed position upon movement of said electromagnet from one extreme position to the other on said disk, a circuit including said switch for controlling the excitation of said electromagnet, and an armature connected to the other of said members and adapted for relative axial movement into frictional engagement with said electromagnet, said electromagnet and said armature constituting the elements of a clutch.

30. In a clutch mechanism comprising, in combination with a driving member and a driven member, two friction elements connected respectively to said members and movable axially into and out of frictional engagement, one of said elements comprising a part fixed to one of said members and a second part splined to said first mentioned part for axial movement, a friction detent slidably disposed in one of said parts for actuation by the other of said parts upon movement of the latter in the closing movement of the clutch through a distance in excess of a predetermined clearance, and in the reverse movement of said part limiting the separation of said elements to said clearance.

31. In a clutch mechanism comprising, in combination with a driving member and a driven member, an end face friction clutch element secured to one of said members, a disk secured to the other of said members, an annular friction element splined to the periphery of said disk for axial movement into and out of frictional engagement with said first mentioned element, a friction guideway in said disk extending parallel to the axis of rotation, a friction plunger slidable in said guideway and having a notch receiving said annular element, said notch permitting a limited relative axial clearance movement of said annular element, and means for imparting a friction drag to said plunger, whereby upon movement of said annular element into engagement with said first mentioned element through a distance greater than said clearance, said plunger will be moved therewith against the resistance of said last mentioned means, and upon movement of said annular element away from said first mentioned element, said plunger will limit the separation of said elements to said clearance.

32. In a control for a clutch mechanism comprising, in combination with a control circuit, a carbon pack rheostat in said circuit, means tending to operate in one direction to place said rheostat under compression, and a clutch pedal for controlling said last mentioned means.

33. In a control for a clutch mechanism comprising, in combination with a control circuit, a carbon pack rheostat in said circuit, means including a rock shaft tending to rotate in a direction to place said rheostat under compression, a dash pot, releasable means connecting said dash pot and said shaft to retard the action of said first mentioned means, and a spring actuated manual clutch pedal operable to disengage said releasable means and to operate said first mentioned means in the other direction to relieve said rheostat of compression.

34. In a control for a clutch mechanism comprising, in combination with a control circuit, a carbon pack rheostat in said circuit, means including a rock shaft tending to operate in one direction to place said rheostat under compression, a dash pot, releasable means connecting said dash pot and said shaft to retard the action of said first mentioned means, a pedal automatically operable in one direction to actuate said first mentioned means in a reverse direction to relieve said rheostat of compression, and a clutch pedal for disengaging said releasable means.

HOWARD D. COLMAN.